United States Patent [19]

Konstant

[11] Patent Number: 4,915,240
[45] Date of Patent: Apr. 10, 1990

[54] MULTIPLE PALLET RACK

[75] Inventor: Anthony N. Konstant, Winnetka, Ill.

[73] Assignee: Konstant Products, Inc., Skokie, Ill.

[21] Appl. No.: 310,880

[22] Filed: Feb. 16, 1989

[51] Int. Cl.$^4$ ................................................. A47F 5/00
[52] U.S. Cl. ..................................... 211/151; 211/162;
414/276
[58] Field of Search ....................... 211/151, 162, 59.2;
414/276, 286

[56] References Cited

U.S. PATENT DOCUMENTS

| | | | |
|---|---|---|---|
| 4,341,313 | 7/1982 | Doring ............................. | 414/276 X |
| 4,462,500 | 7/1984 | Konstant et al. ................. | 414/276 X |
| 4,613,270 | 9/1986 | Konstant et al. .................... | 414/276 |
| 4,687,404 | 8/1987 | Seiz et al. ......................... | 211/151 X |

Primary Examiner—Robert W. Gibson, Jr.
Attorney, Agent, or Firm—Gerstman & Ellis, Ltd.

[57] ABSTRACT

A pallet rack comprises at least one pair of spaced, parallel rails and first and second wheeled carts mounted in rolling relation with the pair of rails, the wheels of first and second carts respectively rolling on the same rolling surfaces. The front wheels of the second cart are positioned between the front and rear wheels of the first cart. As the result of this, the second cart can roll between a first, vertically overlying position relative to the first cart, and a second position where most of the second cart is spaced along the rails from the first cart.

9 Claims, 1 Drawing Sheet

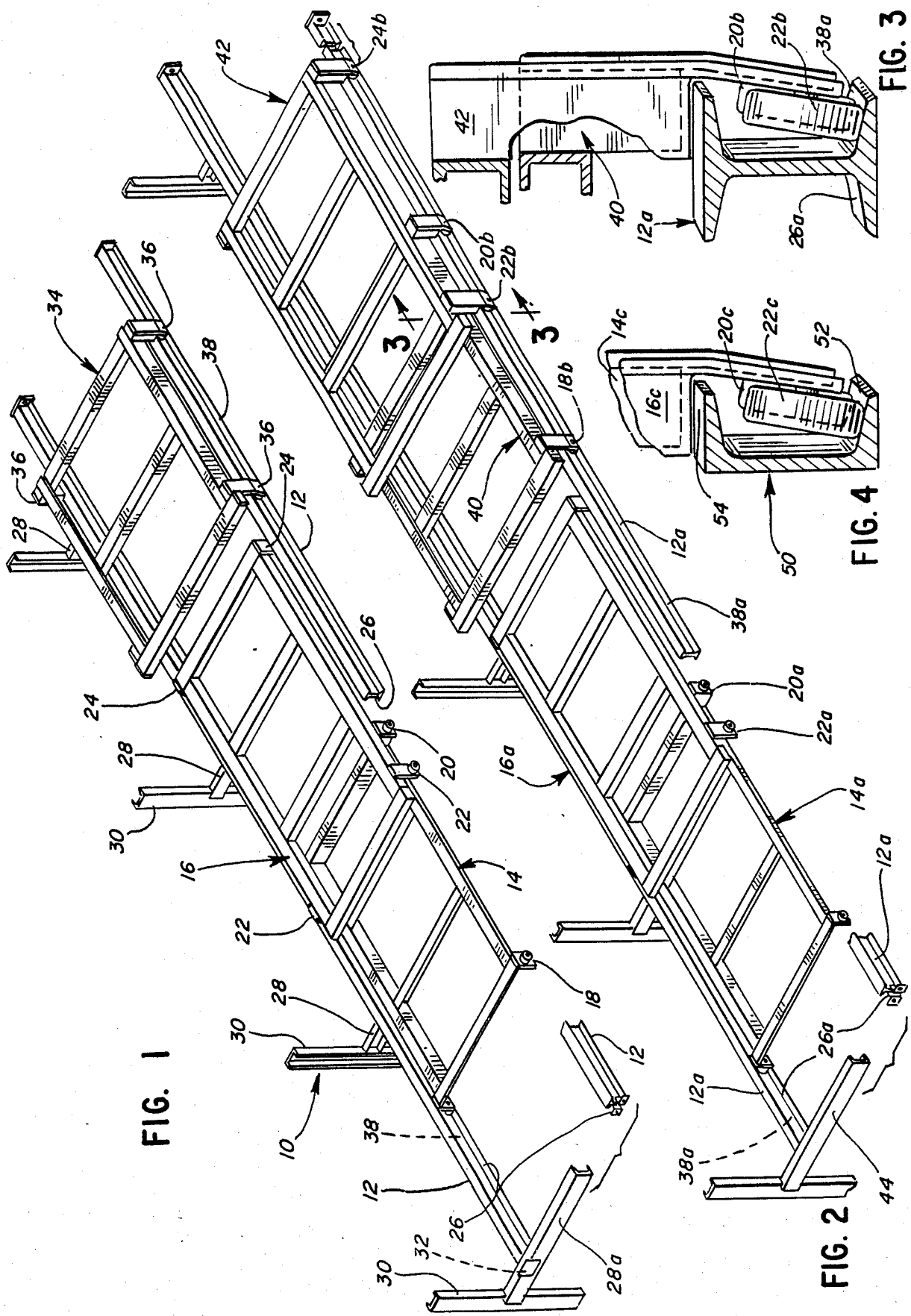

MULTIPLE PALLET RACK

BACKGROUND OF THE INVENTION

In U.S. Pat. Nos. 4,341,313 to Döring, and 4,462,500 to Konstant, et al., for example, pallet racks are disclosed in which large pallets, carrying a load of merchandise or other goods, may be stored at a front end of a rack, and then rolled inwardly to make room for another pallet and load. By such apparatus, improvements in warehouse storage procedures can be obtained, in that one may reduce the number of aisles which extend between storage bays, since each pallet may be installed at the front end of the bay and then rolled rearwardly for storage.

When access to a rearwardly positioned pallet is desired, one may simply remove the pallets in front of it with a lift truck or the like to cause the rearwardly positioned pallet to roll forwardly toward the lift truck for access. Thus, such systems can have a greater storage density of pallets when compared with prior systems.

In Konstant U.S. Pat. No. 4,773,546 a pallet rack is disclosed in which pallets may be sequentially placed on first and second wheeled carts, that may be then rolled rearwardly on a pair of rails by subsequent pallets as they are added to the storage bay. The rails used are arranged so that the wheels of the first and second carts roll on separate tracks or sections of the same rail, so that the carts can roll past each other, one above the other, without interference.

By the invention of this application, a modification is provided in which pallets may be placed on a plurality of wheeled carts, two of which can roll on the same rail surface without interference in the operation of either cart in providing multiple pallet storage in a single storage bay. Additionally, by this invention, a single storage bay and pair of rails can provide convenient, accessible storage for pallets using up to four wheeled carts that will roll on the same rails, for convenient storage of a large number of pallets on a single set of rails.

DESCRIPTION OF THE INVENTION

In this invention, a pallet rack is provided which comprises at least one pair of spaced, parallel rails, and first and second wheeled carts, mounted in rolling relation with a pair of rails. The carts each define a load-carrying area and front and rear wheels, with the second cart being capable of rolling over the first cart to overlie the first cart.

In accordance with this invention, the wheels of the first and second carts respectively roll on the same rail surfaces. This of course means that the wheels of different carts are in a position to collide with each other to limit the cart motion. However, in this invention, the front wheels of the second cart are positioned between the front and rear wheels of the first cart. The result of this is that the second cart can roll between a first, overlying position relative to the first cart and a second position where most of the second cart can be spaced along the rails from the first cart before the front wheels of the second cart and the rear wheels of the first cart collide to limit relative motion between the carts.

While the relative motion between the two carts is not totally unlimited, it becomes quite possible to load the pallet rack by first placing one or more pallets on the second chart while it overlies the first cart, and then pushing the second cart rearwardly of the first cart with another pellet for loading, and then dropping that pallet on the first cart. Thus, the system of this invention can function with essentially equal ease and facility as the invention described in Konstant U.S. Pat. No. 4,773,546 to provide access for multiple pallets in a single bay.

When the lower, first cart has been loaded with pallets, one may still add more pallets by pushing the first cart rearwardly, and with it the second cart, and placing the last pallet or pallets on the rails themselves forward of the first cart in its rearward position.

When it is desired to remove pallets, they may be sequentially removed in reverse order, with the wheeled carts rolling forwardly again, typically because the rails are slightly sloped, for the spontaneous presentation of pallets, one-by-one, to a fork lift truck at the front end of the pallet rack.

Preferably, each of the pair of rails comprises a vertical web and a pair of generally horizontal flange portions having upper surfaces extending outwardly in opposed directions from the web. The wheels of the first and second carts ride on the same one of these flange portions. Thus, it is possible to provide at least one added wheeled cart to roll on the other of the flanged portions, the added wheeled cart being proportioned to permit rolling into vertically overlying relation with the first and second wheeled carts.

In this circumstance, three wheeled carts are available to load pallets and be pushed back, one-by-one, for improved storage capacity of the pallet rack of this invention. The wheels of the added, wheeled cart can roll in a manner which is unrestricted by collision with the wheels of the other carts, while the other two carts, in the previously specified relation, can be used to sequentially store pallets with ease in the manner described above. It should be also understood that the added wheeled pallet in vertically overlying relation is positioned to roll over the first and second pallets.

As an additional embodiment, instead of the added, wheeled cart as described above, a second pair of the first and second wheeled carts in their relationship as described above may be mounted in their rolling relation on the other of the flanged portions, to provide four interrelating, rolling carts on the single pair of rails. All of the carts of the pairs are preferably proportioned to permit rolling into vertically overlying relation with the other carts of the pairs. This is preferably accomplished when the rails are of I-shaped cross section so that a plurality of separate rolling rail surfaces is provided.

Accordingly, by this invention, a pallet rack is provided in which up to four rolling, moving surfaces may be available for the storage of pallets, with a fifth front area being available when the pallets have been pushed rearwardly for added pallet storage on the front sections of the rails themselves. By this means, the pallet racks may be constructed in a warehouse or the like in which the maximum warehouse storage density is provided with fewer access aisles than normal being required, to maximize the efficiency and capacity of the available storage space.

DESCRIPTION OF DRAWINGS

In the drawings,

FIG. 1 is a perspective view, with portions broken away, of one embodiment of the pallet rack of this invention.

FIG. 2 is a perspective view, with portions broken away, of a second embodiment of the pallet rack of this invention.

FIG. 3 is a sectional view taken along line 3—3 of FIG. 2.

FIG. 4 is a fragmentary, sectional view of a third embodiment of the pallet rack of this invention, showing how two carts may roll on a single rolling rail surface of a C-shaped rail in accordance with this invention.

DESCRIPTION OF SPECIFIC EMBODIMENTS

Referring to FIG. 1, a pallet rack 10 is disclosed which comprises at least one pair of spaced, parallel rails 12, which are specifically and preferably of I-shaped cross section, although rails of other cross sections may be used as well. First wheeled cart 14 and second wheeled cart 16 are shown to be mounted in rolling relation with the pair of rails 12, with the respective front and rear rollers 18, 20 of lower cart 14, and front and rear rollers 22, 24 of upper cart 16, being shown to roll upon the inner, lower flange 26 of each of I-beam rails 12. With respect to the specific construction of rails 12, and the specific construction of individual carts, the specific construction may be as disclosed in the previous cited U.S. Pat. No. 4,773,546, except as otherwise described herein.

Rails 12 may be carried by crossbeams 28, which in turn are supported by upright columns 30, provided on both sides of pallet rack 10, but deleted from one side of the drawing for purposes of clear disclosure, and which are of generally conventional construction.

In accordance with this invention, front wheels 22 of the second, upper cart 16 are positioned between front wheels 18 and rear wheels 20 of the first, lower cart 14, as shown. Thus, even though the respective wheels 18, 20, 22, 24 can collide against each other as they roll along on rolling rail surface 26, it still is possible for second cart 16 and first cart 14 to roll to the front end beam 28a of the pallet rack and there to occupy a vertically overlying position with respect to each other, being stopped by stop members 32 at the end of each rail 12 which may be of the design described in the Konstant patent number 4,773,546. In this vertically overlying relation, front wheels 18 and 22 of the respective carts 14, 16, may be in contact with each other, or slightly spaced, and, if desired, rear wheels 20 and 24 may be in similar relation.

A third, added wheeled cart 34 is also provided, in which the respective wheels 36 of cart 34 roll on the outer lower flange 38 of each I-beam rail 12. Thus, added cart 34 can roll freely along the length of rails 12 without wheels 36 bumping into the respective wheels of carts 14, 16. As shown, cart 34 is proportioned to be able to roll into vertically overlying relation with the other two carts 14, 16, particularly at front end 28a, so that a stack of all three carts may be provided at the front end for receiving pallets.

Then, as pallets are loaded into pallet rack 10, one or more pallets are first loaded upon third cart 34. Then, when that cart is filled with pallets, the next pallet brought into the pallet rack by a lift truck pushes the pallet on cart 34 rearwardly, causing cart 34 to roll rearwardly, exposing wheeled cart 16, upon which this next pallet is placed.

When cart 16 is filled, more pallets may be applied by pushing the pallet on cart 16 rearwardly, causing both carts 16 and 34 to roll rearwardly to expose first cart 14 for the receipt of one or more pallets. Following this, the entire array of carts may be pushed rearwardly to place one or more pallets on front portion of rails 12.

For removal of the pallets, the reverse process may be used, with the result that a pallet rack of increased storage density is provided in accordance with this invention.

Referring to FIG. 2, the structure disclosed is similar to the structure of FIG. 1 except for the addition of a fourth rolling cart. Rails 12a, of I-beam shape, are provided in a manner similar to the previous embodiment, for the rolling of a first, interlocking pair of wheeled carts 14a, 16a, which are of a structure and function similar to carts 14, 16 in the previous embodiment. As before, all of the wheels of the respective carts 14a, 16a roll on the inner flange surfaces 26a of rails 12a. The respective rear wheels 20a of cart 14a and front wheels 22a of cart 16a are in interlocked relation as before, with front wheels 22a of cart 16a being positioned between rear wheels 20a and front wheels 18a of first cart 14a.

In this embodiment, a second pair of first and second wheeled carts 40, 42 are positioned with their respective wheels being placed on the outer, lower flanges 38a of the respective I-beam rails 12a. The relationship of their respective wheels is substantially the same as the relationship of the wheels of the carts 14a, 16a, in that the front wheels 22b of fourth cart 42 are positioned on flange surfaces 38a between the front wheels 18b and the rear wheels 20b of third cart 40. This of course implies that the rear wheels 20b of third cart 40 are correspondingly positioned between front wheels 22b and rear wheels 24b of fourth cart 42.

Thus, the rolling action of wheeled carts 40, 42 is similar in function to the rolling action of carts 14a, 16a. The carts 14a, 16a, 40 and 42 are each proportioned so they are all capable of all rolling into vertically overlying relation with each other, particularly adjacent the front end 44 of the pallet rack. Rails 12a are sloped as in the previous embodiment to cause the respective carts to spontaneously roll toward front end 44.

Thus, in this embodiment, one may sequentially load the carts with pallets, then pushing them rearwardly, typically with the next pallet to be loaded before placing that pallet on the next lower cart. The first cart to be loaded is cart 42, which is then pushed rearwardly to load cart 40, following by cart 16a, following by cart 14a, following which, if desired, one may place one or more pallets on the rails 12a adjacent front end 44 for storage.

Thus, the pallet rack of this invention exhibits unprecedented storage capacity while at the same time providing convenient loading and unloading entirely from the front end 44 of the pallet rack, to provide greater storage densities and efficiencies.

Referring to FIG. 4, a modified pallet rack system is disclosed in which the respective rails 50 are of C-shaped cross section, providing a single rolling rail surface 52 for a pair of carts positioned in rolling relation in the manner of carts 14, 16 of FIG. 1. In this particular embodiment, only a pair of rolling carts are provided, with the rear wheels 20c of the first cart 14c being positioned between the front wheels 22c of second cart 16c and the rear wheels of the same. Thus, in this simplified embodiment, the respective carts function in the manner of the previous embodiment on a pair of rails which are of a shape other than an I-beam. If desired, L-shaped rails may be used in place of the C-shaped rails in this embodiment, both of said rails defining angled bars. The upper flange 54 of the C-shaped rail provides the advantage of a certain amount of protection to the rolling rail surface 52 against objects dropping off the pallets, which could interfere with pallet rolling were they to lodge on rolling rail surface 52.

Thus, by this invention, a pallet rack is provided of simple construction and great versatility, providing substantial improvements over the prior art.

The above has been offered for illustrative purposes only, and is not intended to limit the scope of the invention of this application, which is as defined in the claims below.

That which is claimed is:

1. In a pallet rack which comprises at least one pair of spaced, parallel rails having rolling rail surfaces and first and second wheeled carts mounted in rolling relation with said pair of rails, said second cart being capable of rolling over said first cart to overlie said first cart, the improvement comprising, in combination, the wheels of said first and second carts respectively rolling on the same rail surfaces, the front wheels of said second cart being positioned between the front and rear wheels of the first cart, whereby said second cart can roll between a first vertically overlying position relative to said first cart and a second position where most of said second cart is spaced along said rails from said first cart.

2. The pallet rack of claim 1 in which each of said pair of rails comprises a vertical web and a pair of generally horizontal flange portions having upper surfaces extending outwardly in opposed directions from said web, the wheels of said first and second carts riding on the same one of said flange portions.

3. The pallet rack of claim 2 in which at least one added wheeled cart is provided to roll on the other of said flange portions, said added wheeled cart being proportioned to permit rolling into vertically overlying relation with the first and second wheeled carts.

4. The pallet rack of claim 2 in which a second pair of said first and second wheeled carts is mounted in said rolling relation on the other of said flange portions, all of said carts in said pairs being proportioned to permit rolling into vertically overlying relation with the other carts of said parts.

5. The pallet rack of claim 2 in which each of said rails is of I-shaped cross-section.

6. The pallet rack of claim 1 in which said pair of rails are respectively defined by angled bars.

7. In a pallet rack which comprises at least one pair of spaced, parallel rails, having rolling rail surfaces, and first and second wheeled carts mounted in rolling relation with said pair of rails and defining a load-carrying area and front and rear wheels, said second cart being capable of rolling over said first cart to overlie said first cart, the improvement comprising, in combination:

said rails being each of I-shaped cross section, the wheels of said first and second carts respectively rolling on the same rail surfaces, the front wheels of said second cart being positioned between the front and rear wheels of the first cart, whereby said second cart can roll between a first vertically overlying position relative to said first cart and a second position where most of said second cart is spaced along said rails from said first cart;

said same rail surfaces comprising one of the inner and outer lower horizontal flange portions of said I-beam rail, and at least one added wheeled cart is provided to roll on the other of said inner or outer lower flange portions of said I-beam rail, said added wheeled cart being proportioned to permit rolling into vertically overlying relation with the first and second wheeled carts.

8. The pallet rack of claim 7 in which an added pair of said first and second wheeled carts is mounted in said rolling relation on the other of said inner and outer lower flange portions of the I-beam rails.

9. The pallet rack of claim 8 in which all of said carts in said pairs are proportioned to permit rolling into vertically overlying relation with the other carts of said pairs.

* * * * *